J. A. HUSS.
Dressing Entrails.
No. 84,358.
Patented Nov. 24, 1868.
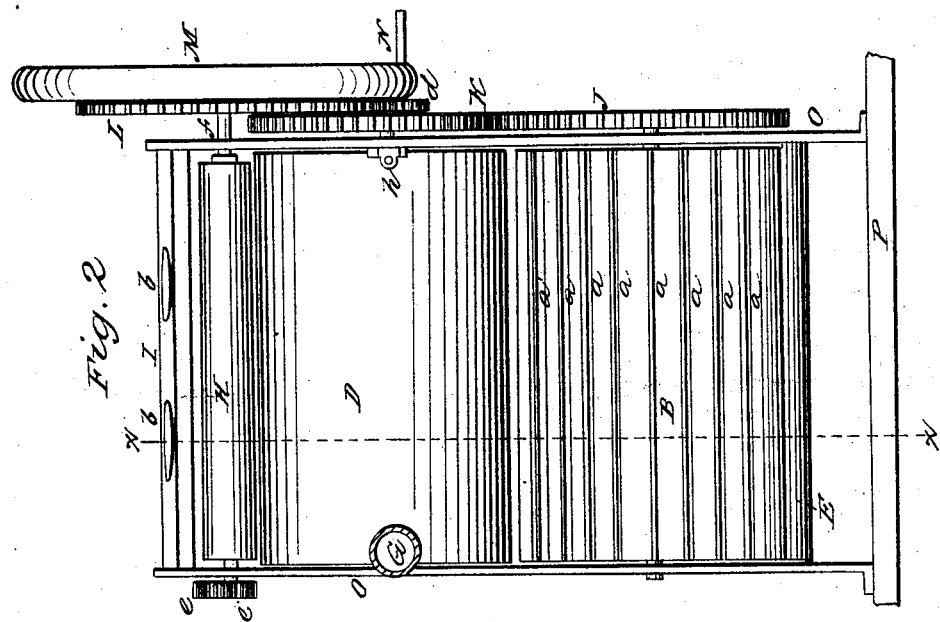
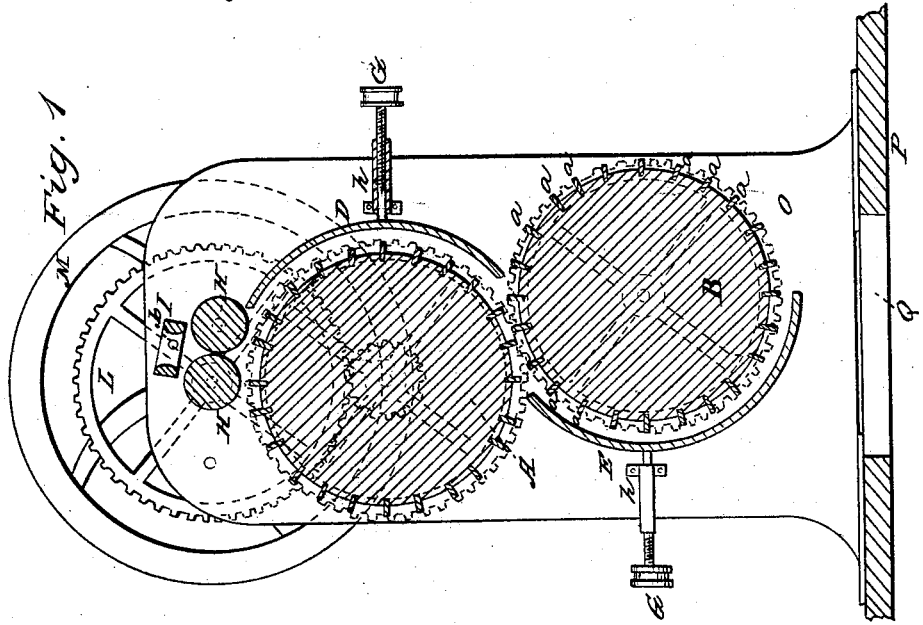
Witnesses:
Inventor:

United States Patent Office.

JOHN ADAM HUSS, OF LOUISVILLE, KENTUCKY.

Letters Patent No. 84,358, dated November 24, 1868.

IMPROVEMENT IN MACHINE FOR CLEANING ENTRAILS.

The Schedule referred to in these Letters Patent and making part of the same.

*To all whom it may concern:*

Be it known that I, JOHN ADAM HUSS, of Louisville, in the county of Jefferson, and State of Kentucky, have invented a new and improved Machine for Cleaning Entrails; and I do hereby declare that the following is a full, clear, and exact description thereof, which will enable those skilled in the art to make and use the same, reference being had to the accompanying drawings, forming part of this specification, in which—

Figure 1 is a section of my machine through the line $x\ x$ of fig. 2.

Figure 2 is a front view of the same machine.

Similar letters of reference indicate corresponding parts.

The nature of this invention relates to the cleaning of animal entrails, and so preparing them for the manufacture of sausages and other articles of use.

It consists of two rollers, revolving in contrary directions, and armed with scraping-edges, affixed radially around the surfaces of the said rollers, together with other devices perfecting the whole, as will hereinafter be duly set forth.

In the accompanying plate of drawings, the rollers are shown at A B, and they have bearings in the upright-frame plates O O, affixed to the bed-frame P.

The rollers are armed with a number of scraping-edges, *a a a*, &c., constructed of wood or metal, though in practice metal may be preferable.

The rollers are made to revolve in contrary directions by means of any suitable gear-wheels, as those shown at J K L *d*, or other equivalent means.

The wheels J K are mounted on the shafts of the rollers B and A, respectively, and the pinion *d* is mounted on the same shaft as the wheel K, and the said pinion engages with the wheel L on the shaft *f* of one of the feed-rollers H H.

These feed-rollers are geared together by pinions *e e*.

The crank-wheel M, having a handle, N, is mounted on the shaft *f* of one of the feed-rollers.

The curved surfaces D E are placed near to the rollers A B, respectively, and are rendered adjustable to a greater or less proximity with the said rollers by set-screws G G, or other equivalent means.

These curved surfaces are formed to correspond with the faces of the rollers, as shown, and, thus formed, serve to hold the entrail while the adipose matter and other adherent substances are scraped from the same by the scraping-edges, *a a a*, &c., as the rollers are revolved.

The feed-rollers H H are of India rubber, or other elastic material, and the cross-bar I, placed above them, is provided with feed-holes *b b*, through which the entrails are fed into the rollers.

The entrails are entered at the holes *b*, and pass around the roller A, between it and the surface D, and thence around the roller B, between it and the surface E, and thence out into any suitable receptacle.

An offal-pipe, of metal or canvas, is to be affixed around the opening Q in the bed-frame P.

The set-screws G work in hollow screw-plates *h*, affixed to the frame-plates O O.

By means of the scraping-edges and the surfaces above described, the entrail is pressed flat, and one-half of the same is scraped by each set of scraping-edges.

The rollers may be geared to revolve with any requisite speed, which speed should be greatly in excess of the speed of the feed-rollers.

The entrail, in passing around both rollers, will roll slightly, but sufficiently, in its passage through the machine, so that the edges of the flattened entrail will come in contact with the scraping-edges, and thus be completely cleaned.

The cleaning of entrails may be accomplished by the employment of only one set of scrapers, and its corresponding surface D; and endless modifications of my invention might be made, wherein more than two rollers were employed, or the scraping-edges might be arranged obliquely for some specious advantage, or stiff bristles might be substituted for the scraping-edges; but in all these modifications the principle of revolving rollers armed with scrapers will still be employed.

In practice, the surfaces D and E will be sustained by spring-tension, to provide elastic action to the same, whereby the entrail will be less liable to be cut by the scrapers.

I claim as new, and desire to secure by Letters Patent—

1. The counter-revolving rollers A B, armed with scraping-edges *a a a*, or the equivalent thereof, all substantially as shown and described, in combination with any curved surface or surfaces, D E, all as set forth.

2. The feed-rollers H H, in combination with the scraping-rollers A B, substantially as described, and for the purpose set forth.

3. The gear-wheels J K *d* L, and crank-wheel M, substantially as described, in combination with the rollers A B, scraping-edges *a a a*, and surfaces D E, all as and for the purpose set forth.

JOHN ADAM HUSS.

Witnesses:
C. A. KOLLMANN,
W. H. SHACK.